(12) United States Patent  (10) Patent No.: US 6,770,351 B1
Kobayashi et al.  (45) Date of Patent: Aug. 3, 2004

(54) BIAXIALLY ORIENTED POLYESTER FILM AND MAGNETIC RECORDING MEDIUM

(75) Inventors: Ieyasu Kobayashi, Sagamihara (JP); Toshifumi Osawa, Sagamihara (JP)

(73) Assignee: Teijin Limited, Osaka (JP)

(*) Notice: Subject to any disclaimer, the term of this patent is extended or adjusted under 35 U.S.C. 154(b) by 135 days.

(21) Appl. No.: 09/762,920

(22) PCT Filed: Jun. 9, 2000

(86) PCT No.: PCT/JP00/03780

§ 371 (c)(1),
(2), (4) Date: Feb. 14, 2001

(87) PCT Pub. No.: WO00/76749

PCT Pub. Date: Dec. 21, 2000

(30) Foreign Application Priority Data

Jun. 14, 1999 (JP) .......................... 11-166593
Dec. 7, 1999 (JP) .......................... 11-347391

(51) Int. Cl.⁷ .................................. G11B 5/73
(52) U.S. Cl. ................. 428/141; 428/212; 428/336; 428/480; 428/694 SL; 428/694 SG
(58) Field of Search ................. 428/141, 212, 428/336, 480, 694 SL, 694 SG

(56) References Cited

U.S. PATENT DOCUMENTS 5,364,684 A * 11/1994 Sakamoto et al. .......... 428/141
5,665,454 A * 9/1997 Hosoi et al. ................. 428/141
5,676,902 A * 10/1997 Seo et al. ................. 264/290.2

FOREIGN PATENT DOCUMENTS

| EP | 843 210 | 5/1998 |
| EP | 893 249 | 1/1999 |
| JP | 59-127730 | 7/1984 |
| JP | 5-212787 | 8/1993 |
| JP | 8-244110 | 9/1996 |
| JP | 11-129327 | 5/1999 |
| JP | 11-144227 | 5/1999 |
| WO | WO99/25553 | 5/1999 |
| WO | 99/29488 | 6/1999 |

OTHER PUBLICATIONS

European Search Report Sep. 2, 2002.

* cited by examiner

*Primary Examiner*—Stevan A. Resan
(74) *Attorney, Agent, or Firm*—Rader, Fishman & Grauer PLLC

(57) ABSTRACT

A biaxially oriented polyester film for magnetic recording media, which has (1) a dimensional change between before treated and after treated in a width direction of 0.40% or less when the film is treated at 49° C. and 90% RH under a load of 170 (g/12.65 mm) in a longitudinal direction for 72 hours, (2) a crystallinity of 27 to 45%, (3) a temperature expansion coefficient $\alpha t$ ($\times 10^{-6}$/° C.) and a humidity expansion coefficient $\alpha h$ ($\times 10^{-6}$/% RH) in a width direction of the film which satisfy the relationship $(\alpha t + 2\alpha h) \leq 45$, (4) a heat shrinkage factor in a width direction of the film of 0 to 0.7%, and (5) a thickness of 3 to 7 μm.

This film is useful particularly for digital data storage of a linear track system, is almost free from an error caused by track dislocation due to a dimensional change in the width of a tape and improves output characteristics.

6 Claims, 1 Drawing Sheet

BIAXIALLY ORIENTED POLYESTER FILM AND MAGNETIC RECORDING MEDIUM

FIELD OF THE INVENTION

The present invention relates to a biaxially oriented polyester film for magnetic recording media, particularly digital data storage tapes, and to a magnetic recording medium comprising the same as a base film.

DESCRIPTION OF THE PRIOR ART

Polyester films are used in a wide range of fields such as magnetic recording media and electric insulation because they have excellent thermal and mechanical properties. Along with marked progress made in the tape capacity and density of magnetic recording media, especially data storage magnetic recording media, higher and higher properties are now required of base films used in these media. In data storage magnetic recording media employing a linear track system such as QIC, DLT and large-capacity super DLT and LTO, the track pitch is made very narrow to increase the capacity of a tape. Therefore, when there is a dimensional change in the width direction of a tape, track dislocation occurs, thereby causing an error. This dimensional change is caused by temperature and humidity variations and also by time shrinkage in the width direction which occurs when the tape is caused to run repeatedly at a high temperature and high humidity under high tension. When this dimensional change is large, track dislocation occurs, thereby causing an error at the time of electromagnetic conversion. Particularly in the latter case, the dimensional change is marked when the thickness of a tape is reduced to increase the recording capacity of the tape. Therefore, this dimensional change must be improved. The time shrinkage in the width direction can be improved by increasing the Young's modulus in a longitudinal direction of the base film. However, the upper limit of Young's modulus in a transverse direction becomes smaller as the Young's modulus in a longitudinal direction increases according to the relationship between the characteristic properties and film formation properties of a polymer. As a result, the dimensional change caused by temperature and humidity variations in the former case becomes large, thereby making it difficult to reduce the dimensional changes in both cases at the same time.

JP-A 5-212787 (the term "JP-A" as used herein means an "unexamined published Japanese patent application") discloses a biaxially oriented polyethylene-2,6-naphthalene dicarboxylate film having a Young's modulus in a longitudinal direction (EM) of 550 kg/mm$^2$ or more and a Young's modulus in a transverse direction (ET) of 700 kg/mm or more, a ratio of Young's moduli (ET/EM) of 1.1 to 2.0, a shrinkage factor in a longitudinal direction of 0.02% or less when it is maintained at a relative humidity of 65% at 70° C. under no load for 1 hour, a temperature expansion coefficient ($\alpha$t) in a longitudinal direction of $10 \times 10^{-6}$/° C. or less and a humidity expansion coefficient ($\alpha$h) in a longitudinal direction of $15 \times 10^{-6}$/% RH or less.

International Publication WO99/29488 discloses a biaxially oriented polyester film having a thickness of less than 7 $\mu$m, which has the following relationship among its thermal expansion coefficient $\alpha$t ($\times 10^{-6}$/° C.) in a transverse direction, humidity expansion coefficient $\alpha$h ($\times 10^{-6}$/% RH) in a transverse direction and shrinkage factor P (ppm/g) in a transverse direction against a load applied in a longitudinal direction.

$$1 < P - (\alpha t + \alpha h)/10 \leq 10$$

SUMMARY OF THE INVENTION

It is an object of the present invention to provide a biaxially oriented polyester film which has solved the above problems, hardly produces an error caused by track dislocation due to a dimensional change in the width of a tape and can improve output characteristics as a base film for digital data storage magnetic recording media of a linear track system.

It is another object of the present invention to provide a magnetic recording medium, especially a digital data storage magnetic recording medium comprising the biaxially oriented polyester film of the present invention as a base film.

Other objects and advantages of the present invention will become apparent from the following description.

Firstly, according to the present invention, the above objects and advantages of the present invention are attained by a biaxially oriented polyester film for magnetic recording media which has (1) a dimensional change between before treated and after treated in a direction perpendicular to a load application direction on the film plane of 0.40% or less when the film is treated at 49° C. and 90% RH under a load of 2.7 kg per 1 mm$^2$ of unit sectional area in a thickness direction of the film for 72 hours, (2) a crystallinity of 27 to 45%, (3) a temperature expansion coefficient $\alpha$t in a direction perpendicular to the above load application direction on the film plane of $-5 \times 10^{-6}$ to $+20 \times 10^{-6}$/° C. and a humidity expansion coefficient $\alpha$h in a direction perpendicular to the above load application direction on the film plane of $+5 \times 10^{-6}$ to $+20 \times 10^{-6}$/% RH, the value of ($\alpha$t $+2$ $\alpha$h) being $+45 \times 10^{-6}$ or less, (4) a heat shrinkage factor in a direction perpendicular to the above load application direction on the film plane of 0 to 0.7%, and (5) a thickness of 3 to 7 $\mu$m.

Secondly, the above objects and advantages of the present invention are attained by a magnetic recording medium comprising the biaxially oriented polyester film of the 'present invention and a magnetic layer formed on one side of the polyester film.

THE PREFERRED EMBODIMENT OF INVENTION

Figure 1:
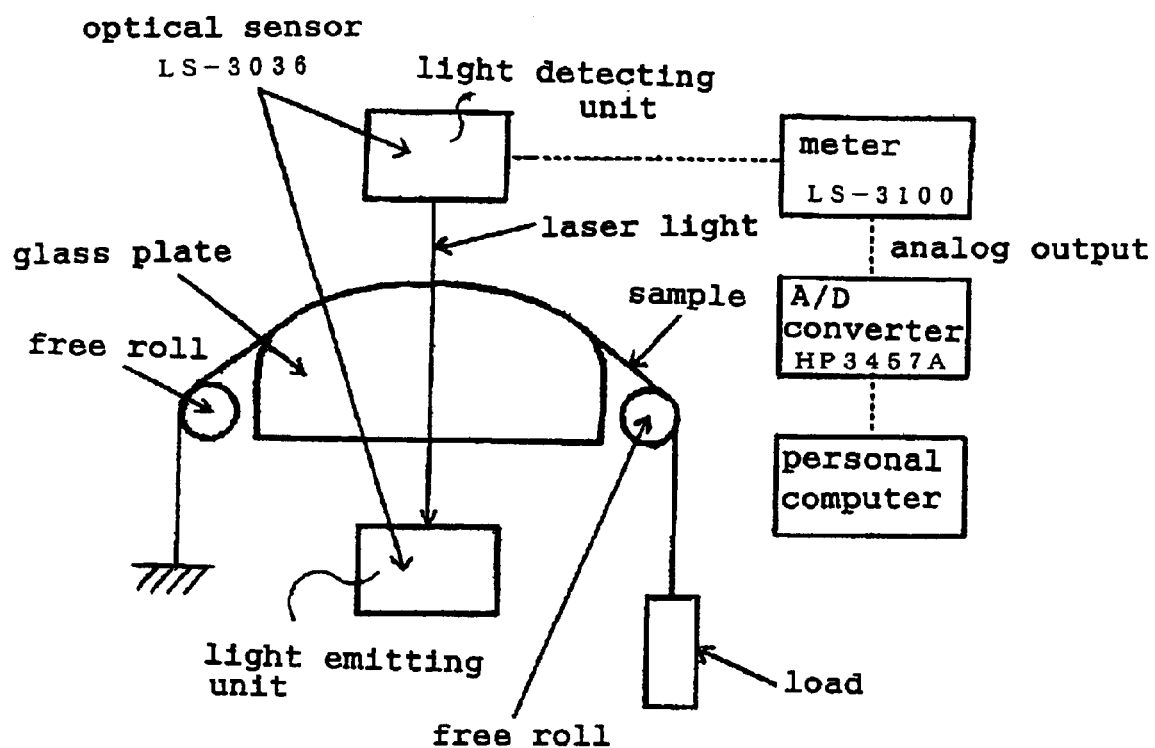
FIG. 1 is a diagram for explaining an apparatus for measuring the shrinkage factor of a film in a transverse direction.

Examples of a polyester as a raw material for the biaxially oriented polyester film of the present invention include polyethylene terephthalate, polyethylene isophthalate, polybutylene terephthalate, polyethylene-2,6-naphthalene dicarboxylate, polyethylene-$\alpha$,$\beta$-bis(2-chlorophenoxy)ethane-4,4'-dicarboxylate and copolymers of two or more of the recurring units of these polyesters. Out of these, polyethylene terephthalate, polyethylene-2,6-naphthalene dicarboxylate and polyethylene-$\alpha$,$\beta$-bis(2-chlorophenoxy)ethane-4,4'-dicarboxylate are preferred, and polyethylene-2,6-naphthalene dicarboxylate is particularly preferred.

The polyester in the present invention may be one of the above polymers or a mixture of two or more of the above polymers. Various additives may be added in limits not prejudicial to the effect of the present invention.

The above polyester has an intrinsic viscosity measured at 35° C. in an o-chlorophenol solution of preferably 0.4 to 0.9, more preferably 0.5 to 0.7, particularly preferably 0.51 to 0.65.

Surface Roughness and Added Particles

The biaxially oriented polyester film of the present invention may be a single-layer film or laminated film. The surface roughness WRa (center plane average roughness) of the magnetic layer side of the film is preferably 1 to 10 nm, more preferably 2 to 10 nm, particularly preferably 2 to 8 nm. WRz (10-point average roughness) is preferably 30 to 250 nm, more preferably 30 to 200 nm, particularly preferably 30 to 150 nm. When the surface roughness WRa is larger than 10 nm or WRz is larger than 150 nm, the surface of the magnetic layer becomes rough and satisfactory electromagnetic conversion characteristics cannot be obtained. When the surface roughness WRa is smaller than 1 nm or WRz is smaller than 30 nm, the surface becomes too flat, the film does not slip over a pass roll or calendar smoothly or wrinkles, the magnetic layer cannot be formed well by coating, or calendering cannot be carried out well.

The surface roughness WRa (center plane average roughness) and WRz (10-point average roughness) of the no magnetic layer side (on which a back coat layer is formed) of the biaxially oriented polyester film are substantially the same as the surface roughnesses WRa and WRz of the above magnetic layer side when the film is a single-layer film. In this case, the values of surface roughnesses WRa and WRz are selected to achieve satisfactory electromagnetic conversion characteristics and running properties.

In the case of a laminated film, the surface roughness WRa (center plane average roughness) of the no magnetic layer side of the film is preferably 5 to 20 nm, more preferably 5 to 15 nm, particularly preferably 8 to 12 nm. WRz (10-point average roughness) is preferably 100 to 300 nm, more preferably 100 to 200 nm, particularly preferably 150 to 200 nm. When the surface roughness WRa is larger than 20 nm or WRz is larger than 300 nm, the tossing of the surface of the flat layer (magnetic layer) by protrusions and the transfer of surface irregularities to the surface of the magnetic layer at the time of winding a magnetic tape become marked, the surface of the magnetic layer becomes rough, and satisfactory electromagnetic conversion characteristics cannot be obtained. When the surface roughness WRa is smaller than 5 nm or WRz is smaller than 100 nm, the slipperiness of the film lowers, air squeezability deteriorates, and pimple or crease in a longitudinal direction are formed by slitting the film. Thus, satisfactory winding properties cannot be obtained.

The surface roughnesses WRa and WRz can be controlled by containing inert fine particles such as inorganic particles containing in the film the group IIA, IIB, IVA or IVB element of the periodic table (such as kaolin, alumina, titanium oxide, calcium carbonate or silicon dioxide) or polymer fine particles having high heat resistance such as crosslinked silicone resin, crosslinked polystyrene or crosslinked acrylic resin particles, or by carrying out a surface treatment for forming fine irregularities, for example, coating a slippery coating agent. When inert fine particles are contained, the fine particles have an average particle diameter of preferably 0.05 to 0.8 $\mu$m, more preferably 0.1 to 0.6 $\mu$m, particularly preferably 0.1 to 0.4 $\mu$m. The amount of the inert fine particles is preferably 0.001 to 1.0 wt %, more preferably 0.01 to 0.5 wt %, particularly preferably 0.02 to 0.3 wt % based on the polymer. The inert fine particles contained in the film may be a single-component particles or multi-component particles. In order to achieve electromagnetic conversion characteristics for a tape and winding properties for a film at the same time, it is preferred to contain two or more component inert fine particles in the polymer for the no magnetic layer side. The control of WRa and WRz of the film surface may be carried out by suitably selecting the average particle diameter and the amount of the fine particles from the above ranges. WRz is preferably controlled by making sharp the particle diameter of the fine particles or using a means of removing coarse particles.

Although the biaxially oriented polyester film of the present invention may be a single-layer film or laminated film, it is preferably a laminated film because it is easy to achieve electromagnetic conversion characteristics for a tape and winding properties for a film at the same time. The laminated film is a laminate consisting of two or more polyester layers. The two or more polyesters of the each layer of the laminated film may be the same or different but preferably the same.

The biaxially oriented polyester film of the present invention includes a biaxially oriented polyester film coated with a coating layer on one side or both sides to improve adhesion or slipperiness. The coating layer preferably contains a polyester-based, polyurethane-based or polyacryl-based aqueous resin (such as a water-soluble resin, water dispersible resin, etc.) in an amount of 50 wt % or more based on the total solid content. Any known coating film forming aqueous resin may be used as the aqueous resin. To improve slipperiness, the coating layer may contain inert particles. Examples of the inert particles include inorganic particles such as colloidal silica and organic particles such as crosslinked acrylic resin particles, silicone resin particles and polystyrene particles. Out of these, organic particles are more preferred than inorganic particles from the viewpoint of chipping resistance. The average particle diameter of the particles is preferably 5 to 100 nm, more preferably 5 to 50 nm, particularly preferably 5 to 30 nm. The content of the particles is preferably 0.5 to 40 wt %, more preferably 1 to 30 wt %, particularly preferably 5 to 20 wt % based on the total solid content of the coating. The particles are preferably as spherical as possible and as uniform in size as possible. It is desired that the coating layer should contain a surfactant in an amount of preferably 1 to 30 wt %, more preferably 5 to 20 wt % particularly preferably 5 to 15 wt % based on the total solid content. The thickness (solid content) of the coating layer is preferably 1 to 50 nm, more preferably 1 to 30 nm, particularly preferably 3 to 20 nm.

The formation of the coating layer may be carried out by an in-line coating system that a polyester film in the formation step is uniaxially stretched, coated, stretched in a direction perpendicular to the above stretching direction and then dried, or an off-line coating system that a biaxially oriented film is coated. The in-line coating system is more preferred from the viewpoint of the formation of a coating layer.

Thickness of Film

The biaxially oriented polyester film of the present invention has a total thickness of 3 to 7 $\mu$m, preferably 4 to 6 $\mu$m. When the thickness is larger than 7 $\mu$m, the obtained tape becomes too thick, whereby the length of the tape stored in a cassette becomes too small, thereby making it impossible to obtain a sufficient magnetic recording capacity. When the thickness is smaller than 3 $\mu$m, the film often breaks at the time of film formation and the winding properties of the film become unsatisfactory because the film is too thin, thereby making it impossible to obtain a nice film roll.

Dimensional Change in Direction Perpendicular to Load Application Direction Caused by Temperature and Humidity Treatment Under Load When the biaxially oriented polyester film of the present invention is treated at 49° C. and 90% RH under a load of 2.7 kg per 1 mm² of unit sectional area in a film thickness direction for 72 hours, its dimensional change in a direction (width direction) perpendicular to the above load application direction on the film plane before and after the treatment is 0.40% or less. The dimensional change is preferably 0.35% or less, particularly preferably 0.3% or less. When this dimensional change is larger than 0.4% and the obtained tape is caused to run repeatedly under high tension at a high temperature and high humidity, its dimensional change in a width direction becomes large, thereby causing track dislocation with the result of the occurrence of recording and reproduction errors.

Crystallinity

The biaxially oriented polyester film of the present invention has a crystallinity of 27 to 45%, preferably 30 to 40%, particularly preferably 30 to 45%. When this crystallinity is lower than 27%, the dimensional change in a width direction caused by the application of a load in a longitudinal direction becomes large, thereby causing track dislocation. When the crystallinity is larger than 45%, the reversible dimensional change in a width direction caused by temperature and humidity variations becomes large, thereby causing track dislocation.

Heat Shrinkage Factor

The biaxially oriented polyester film of the present invention has a heat shrinkage factor in the above width direction of preferably 0 to 0.7%. more preferably 0 to 0.5%, particularly preferably 0 to 0.3%. When the heat shrinkage factor is smaller than 0%, the film elongates, becomes wavy, is not wound well or is chipped in the film formation step or the like. When the heat shrinkage factor is larger than 0.7%, the dimensional change in the width direction becomes large, thereby causing track dislocation.

Expansion Coefficient

The biaxially oriented polyester film of the present invention has a temperature expansion coefficient $\alpha t$ in the above width direction on the film plane of $-5 \times 10^{-6}$ to $+20 \times 10^{-6}/°$C., and a humidity expansion coefficient $\alpha h$ in the above width direction on the film plane of $+5 \times 10^{-6}$ to $+20 \times 10^{-6}$/% RH, the value of ($\alpha t + 2\ \alpha h$) being $+45 \times 10^{-6}$ or less. The value of ($\alpha t + 2\ \alpha h$) is preferably $+40 \times 10^{-6}$ or less, more preferably $+35 \times 10^{-6}$ or less. When the value of ($\alpha t + 2\ \alpha h$) is larger than $45 \times 10^{-6}$, the dimensional change caused by temperature and humidity variations becomes large, causing track dislocation with the result of the occurrence of recording and reproduction errors.

Heat Absorption Peak

Preferably, the biaxially oriented polyester film of the present invention has an endothermal peak of 0.05 mJ/mg or more at a temperature range of 120 to 160° C. when measured by a differential scanning calorimeter (DSC). When the heat absorption peak is lower than 0.05 mJ/mg, the creep of the tape is not improved and the dimensional change in the width direction of the film which is caused to run repeatedly at a high temperature and high humidity under high tension becomes large, thereby causing track dislocation with the result of the occurrence of recording and reproduction errors.

The heat absorption peak is preferably 0.1 mJ/mg or more, more preferably 0.2 mJ/mg or more.

Young's Modulus

The biaxially oriented polyester film of the present invention has a Young's modulus in the above load application direction (longitudinal direction) of preferably 6 GPa or more, more preferably 7 GPa or more, particularly preferably 8 GPa or more. When the Young's modulus in the longitudinal direction is smaller than 6 GPa, the strength in a longitudinal direction of a magnetic tape lowers, whereby the tape easily breaks when great force is applied in the longitudinal direction at the time of recording and reproduction. The Young's modulus in a direction (transverse direction) perpendicular to the above load application direction is preferably 4 GPa or more, more preferably 5 GPa or more, particularly preferably 6 GPa or more. When the Young's modulus in the transverse direction is smaller than 4 GPa, the dimensional change in the transverse direction of a magnetic tape of a linear track system becomes large at the time of temperature and humidity variations, thereby causing track dislocation with the result of the occurrence of recording and reproduction errors.

The total of Young's moduli in longitudinal and transverse directions is preferably 10 to 20 GPa, more preferably 12 to 16 GPa. Further, when the biaxially oriented polyester film of the present invention is used for a magnetic tape of a linear track system, its Young's modulus in a longitudinal direction is preferably larger than its Young's modulus in a transverse direction to suppress the elongation of the film in a longitudinal direction. When the total of Young's moduli in longitudinal and transverse directions is smaller than 10 GPa, the obtained magnetic tape easily breaks due to reduced strength and recording and reproduction errors occur due to track dislocation caused by a large dimensional change at the time of temperature and humidity variations. Therefore, a satisfactory high-density magnetic medium cannot be obtained. When the total of Young's moduli is larger than 20 GPa, the draw ratio becomes large at the time of film formation and the film often breaks, thereby greatly reducing the yield of products.

Film Formation Process

The biaxially oriented polyester film of the present invention is preferably produced by the following process.

A single-layer film can be produced as follows. A molten polyester is extruded into a film form from a die preferably at a temperature of the melting point (TM: ° C.) of the polyester to (Tm+70)° C. and solidified by quenching to obtain an unstretched film which is then stretched to a predetermined draw ratio in a uniaxial direction (longitudinal or transverse direction) at a temperature of (Tg−10) to (Tg+70)° C. (Tg: glass transition temperature of the polyester) and then to a predetermined draw ratio in a direction perpendicular to the above stretching direction (transverse direction when the film was first stretched in a longitudinal direction) at a temperature of Tg to (Tg+70)° C. and further heat set. The draw ratios, stretching temperatures and heat setting conditions are selected and determined based on the characteristic properties of the above film. The area draw ratio is preferably 15 to 35 times, more preferably 20 to 30 times. The heat setting temperature may be selected from a range of 190 to 250° C. and the treatment time may be selected from a range of 1 to 60 seconds.

Simultaneous biaxial orientation may be employed in addition to the above sequential biaxial orientation. The number of times of stretching in each of the longitudinal and transverse directions is not always one and may be plural in the sequential biaxial orientation. The present invention is not limited by the number of times. For example, in order to improve mechanical properties, the above biaxially oriented film before heat setting is heated at a temperature of (Tg+20) to (Tg+70)° C. and further stretched in a longitudinal or transverse direction at a temperature 10 to 40° C. higher than the above heat treatment temperature and then in a transverse or longitudinal direction at a temperature 20 to 50° C. higher than the above stretching temperature. In this case, the total draw ratio in the longitudinal direction is preferably 4.0 to 6.0 times and the total draw ratio in the transverse direction is preferably 3.0 to 6.0 times.

To produce a laminated film by a co-extrusion method, two or more molten polyesters are laminated together in a die and coextruded in a film form preferably at a temperature of the melting point of each polyester (Tm: ° C.) to (Tm+70)° C., or two or more molten polyesters are extruded from respective dies and then laminated together. Thereafter, the laminated film is solidified by quenching to obtain a laminated unstretched film which is then biaxially oriented and heated by the same process and conditions as the single-layer film to obtain a laminated biaxially oriented film.

To produce a laminated film by a coating method, a desired coating solution is coated on one side or both sides of the above (laminated) unstretched film or (laminated) uniaxially stretched film.

Magnetic Recording Medium

According to the present invention, there is also provided a magnetic recording medium comprising the above biaxially oriented polyester film of the present invention as a base film and a magnetic layer formed on one side of the film.

The magnetic recording medium is not particularly limited if it comprises the biaxially oriented polyester film of the present invention as a base film. Examples of the magnetic recording medium include data storage tapes of a linear track system such as QIC, DLT, and large-capacity S-DLT and LTO. Since the base film has an extremely small dimensional change caused by temperature and humidity variations and an extremely small dimensional change caused by time shrinkage (creep) in a width direction due to time elongation (creep) in a longitudinal direction which occurs when the film is caused to run repeatedly at a high temperature and high humidity under high tension, there is obtained a magnetic recording medium which is suitable for high-density and high-capacity recording and rarely causes track dislocation even when the track pitch is narrowed to increase the capacity of the tape.

EXAMPLES

The following examples are given to further illustrate the present invention. Various physical property values and characteristic properties in the present invention were measured and defined as follows.

(1) Young's Modulus

The film is cut to a sample width of 10 mm and a length of 15 cm and the obtained sample is pulled by an Instron universal tension tester at a chuck interval of 100 mm, a pulling speed of 10 mm/min and a chart speed of 500 mm/min to calculate a Young's modulus from the tangent line of a rising portion in the obtained load-elongation curve.

(2) Surface Roughness (WRa, WRz)

The surface roughness is measured 10 times or more (n) by the non-contact 3-D roughness meter (NT-2000) of WYKO Co., Ltd. at a measurement magnification of 25× and a measurement area of 246.6 μm×187.5 μm (0.0462 mm²) to obtain a center plane average roughness (WRa) and a 10-point average roughness (WRz) with surface analytical software incorporated in the roughness meter.

(A) Center Plane Average Roughness (WRa)

$$WRa = \sum_{k=1}^{m}\sum_{j=1}^{n} |Z_{jk} - \bar{Z}|/(m \cdot n)$$

wherein $$\bar{Z} = \sum_{k=1}^{m}\sum_{j=1}^{n} Z_{jk}/(m \cdot n)$$

$Z_{jk}$ is the height of a 3-D roughness chart at a j-th and k-th position in respective directions when the measurement direction (246.6 μm) and a direction (187.5 μm) perpendicular to the measurement direction are divided into m and n sections.

(B) 10-point Average Roughness (WRz)

The average roughness is obtained from five highest peaks (Hp) and five lowest valleys (Hv) and taken as WRz.

$$WRz = \frac{(H_{p1}+H_{p2}+H_{p3}+H_{p4}+H_{p5}) - (H_{v1}+H_{v2}+H_{v3}+H_{v4}+H_{v5})}{5}$$

(3) Average Particle Diameter of Inert Particles

This is measured using the CP-50 centrifugal particle size analyzer of Shimadzu Corporation. The particle diameter equivalent to 50 mass percent is read from the accumulative curve of the particle diameter and amount of particles of each size calculated from the obtained centrifugal sedimentation curve and taken as average particle diameter.

(4) Heat Shrinkage Factor in Width Direction

A film sample having a length of about 30 cm and a width of 1 cm prepared by cutting in a width direction of a film whose length has been accurately measured is placed in a thermostatic chamber maintained at a temperature of 105° C. under no load, kept for 30 minutes, taken out from the chamber and returned to room temperature to read its dimensional change. The heat shrinkage factor of the film sample is obtained from the length (L0) before the heat treatment and the length (L1) after the heat treatment according to the following expression.

heat shrinkage factor=(L0−L1)/L0×100 [%]

(5) Temperature Expansion Coefficient (αt)

A film sample having a length of 15 mm and a width of 5 mm prepared by cutting in a width direction of a film is set in the TMA3000 of Shinku Riko Co., Ltd., kept under a nitrogen atmosphere at 60° C. for 30 minutes and cooled to room temperature. Thereafter, the length of the film sample is measured at each temperature by increasing from 25° C. to 70° C. at a rate of 2° C./min to calculate the temperature expansion coefficient (αt) of the film from the following expression.

αt={(L2−L1)/(L1×ΔT)}+0.5×10⁻⁶ (note)

L1: sample length (mm) at 40° C.
L2: sample length (mm) at 60° C.
ΔT: 20 (=60−40° C.)
Note: temperature expansion coefficient of quartz glass (6) Humidity Expansion Coefficient (αh)

A film sample having a length of 15 mm and a width of 5 mm prepared by cutting in a width direction of a film is set in the TMA3000 of Shinku Riko Co., Ltd. and kept under a nitrogen atmosphere at a humidity of 30% RH and then 70 RH % to measure the length of the sample so as to calculate the humidity expansion coefficient of the film from the following expression.

αh={(L2−L1)/(L1×ΔH)}

L1: sample length (mm) at 30% RH
L2: sample length (mm) at 70% RH
ΔH: 40 (=70−30% RH)

(7) Residual Shrinkage in Width Direction After Load Application in Longitudinal Direction of Film A film sample (length of 30 cm) slit to a width of 12.65 mm (½inch) is set as shown in FIG. 1 at a temperature of 23° C. and a humidity of 50%. Gold is deposited on the surface of the film sample slit to 12.65 mm by sputtering so that the size in a width direction of the film sample can be measured by a detector. In this state, a 2.7 kg weight per unit section in a thickness direction of the film is placed on one side (the other side is fixed) of the film sample to measure the width (L1) of the film sample by the laser outer diameter measuring instrument (controller: model 3100, sensor: model 3060) of Keyence Corporation.

Thereafter, a 2.7 kg weight per unit section in the thickness direction of the film is placed on one side (the other side is fixed) of the film sample at 49° C. (120° F.) and 90% RH for 72 hours (3 days) and removed. After the film sample is kept at a temperature of 23° C. and a humidity of 50% for 24 hours, a 170 g (6 oz) weight is placed on one side (the other side is fixed) of the film sample to measure the width (L2) of the film sample by the laser outer diameter measuring instrument (controller: model 3100, sensor: model 3060) of Keyence Corporation.

The dimensional change ($\alpha W$) in a width direction before and after temperature and humidity treatment under load is calculated from the sizes measured before and after the temperature and humidity treatment according to the following expression.

$$\alpha W = \{(L2-L1)/L1\} \times 100 (\%)$$

(8) Crystallinity

The density of a polyester film is measured by a density gradient tube to calculate crystallinity from the following expression.

$$\text{crystallinity } (\%) = (d-da)/(dc-da) \times 100$$

d: film density
da: non-crystal density
dc: crystal density

In the case of polyethylene-2.6-naphthalene dicarboxylate, da: non-crystal density=1.325 $g/cm^3$ and dc: crystal density=1.407 $g/cm^3$.

(9) Track Dislocation (Error Rate)

The error rate is measured under the following conditions using the ML4500B QIC system of Media Logic Co., Ltd.
current: 15.42 mA
frequency: 0.25 MHz
location =0
threshold: 40.0
bad/good/max: 1/1/1
number of tracks: 28

The error rate is expressed by the average value of measured tracks (=28)

Measurements under conditions 1 and conditions 2 are carried out as follows.

Conditions 1

Signals are recorded at 10° C. and 10% RH and then reproduced at 450° C. and 80% RH to measure the amount of track dislocation caused by temperature and humidity variations.

Conditions 2

Signals are recorded on a tape at 23° C. and 50% RH, the tape is caused to run repeatedly at 40° C. and 60% RH for 60 hours and maintained at 23° C. and 50% RH for 24 hours, and the recorded signals are reproduced to measure the amount of track dislocation caused by shrinkage in a width direction owing to running at a relatively high temperature and high humidity.

Evaluation Criteria are as Follows
◎: no error rate
○: there is an error rate but there is no problem for practical use.
X: there is a problem for practical use due to a large error rate

(10) Glass Transition Point (Tg)

10 mg of a film is molten at 330° C. in 5 minutes, set in the SSC5200 DSC220 heat analyzing system (differential scanning calorimeter) of Seiko Instruments Inc. and heated in a nitrogen air stream at a temperature elevation rate of 20° C./min. The temperature of the middle point of an area where the base line becomes discontinuous is taken as Tg.

(11) Amount of Endothermal Energy of Endothermal Peak 10 mg of a film is set in the SSC5200 DSC220 heat analyzing system (differential scanning calorimeter) of Seiko Instruments Inc. and heated in a nitrogen air stream at a temperature elevation rate of 20° C./min to obtain the amount of endothermal energy of an endothermal peak from an endothermal side area on a DSC chart corresponding to the endothermal energy of the film. This area is shifted from the base line to the endothermal side by increasing the temperature. This area is an endothermal side area where the temperature keeps rising, reaches an endothermal peak and returns to the position of the base line. The position of endothermal start temperature and the position of endothermal end temperature are connected by a straight line to obtain the area (A). In (indium) is measured under the same DSC measurement conditions and the amount of endothermal energy is obtained from the following expression under the condition that the area (B) of indium is 28.5 mJ/mg.
amount of endothermal energy=(A/B)×28.5 mJ/mg Example 1

Polyethylene-2,6-naphthalene dicarboxylate which contained 0.02 wt % of calcium carbonate particles having an average particle diameter of 0.6 $\mu$m and 0.2 wt % of silica particles having an average particle diameter of 0.1 $\mu$m was dried at 180° C. for 5 hours, supplied to the hopper of an extruder, molten at 300° C., extruded using a T shaped extrusion die and solidified by quenching on a casting drum maintained at a surface finishing of 0.3 S and a surface temperature of 60° C. to obtain an unstretched film.

This unstretched film was preheated at 75° C. and stretched to 5.1 times between low-speed and high-speed rolls by heating with an infrared heater having a surface temperature of 830° C. from 14 mm above, quenched and supplied to a stenter to be stretched to 4.8 times in a transverse direction at 125° C. Thereafter, the film was heat set at 240° C. for 10 seconds and relaxed by 1.0% in a transverse direction at 120° C. to obtain a 4.5 $\mu$m thick biaxially oriented film. The obtained film had a Young's modulus in a longitudinal direction of 8 GPa and a Young's modulus in a transverse direction of 6.5 GPa.

The following composition was placed in a ball mill, kneaded for 16 hours and dispersed, and 5 parts by weight of an isocyanate compound (Desmodule L of Bayer AG) was added and dispersed by high-speed shearing for 1 hour to prepare a magnetic coating.

Composition of Magnetic Coating
needle-like Fe particles 100 parts by weight
vinyl chloride—vinyl acetate copolymer 15 parts by weight (Eslec 7A of Sekisui Chemical Co., Ltd.)
thermoplastic polyurethane resin 5 parts by weight
chromium oxide 5 parts by weight
carbon black 5 parts by weight
lecithin 2 parts by weight fatty acid ester 1 parts by weight
toluene 50 parts by weight
methyl ethyl ketone 50 parts by weight
cyclohexanone 50 parts by weight This magnetic coating was applied to one side of the above polyethylene-2,6-naphthalene dicarboxylate film to a coating thickness of 0.5 μm, and the resulting film was aligned in a DC magnetic field of 2,500 Gauss, dried by heating at 100° C., supercalendered (linear pressure of 2,000 N/cm, temperature of 80° C.) and wound up. The wound roll was kept in an oven heated at 55° C. for 3 days.

A coating material for back coating having the following composition was applied to a thickness of 1 μm and dried and the obtained film was cut to 12.65 mm (½inch) to obtain a magnetic tape.

Coating Material for Back Coating
carbon black 100 parts by weight
thermoplastic polyurethane resin 60 parts by weight
isocyanate compound 18 parts by weight
(Colonate L of Nippon Polyurethane Kogyo Co., Ltd.)
silicone oil 0.5 parts by weight
methyl ethyl ketone 250 parts by weight
toluene 50 parts by weight The characteristic properties of the obtained film and tape are shown in Table 1. As is obvious from this table, the obtained tape had a small error rate and excellent output characteristics.

Example 2

Polyethylene-2,6-naphthalene dicarboxylate for layer A which contained 0.13 wt % of crosslinked silicone resin particles having an average particle diameter of 0.3 μm and 0.25 wt % of spherical silica particles having an average particle diameter of 0.1 μm and polyethylene-2,6-naphthalene dicarboxylate for layer B which contained 0.1 wt % of spherical silica particles having an average particle diameter of 0.1 μm were prepared. Pellets of the polyethylene-2,6-naphthalene dicarboxylates were dried at 180° C. for 5 hours and supplied to the hoppers of two respective extruders and molten at 300° C. so that layers A and layer B were laminated together and extruded using a multi-manifold co-extrusion die and solidified by quenching on a casting drum maintained at a surface finishing of 0.3 S and a surface temperature of 60° C. to obtain an unstretched film.

This unstretched film was preheated at 75° C., stretched to 5.4 times between low-speed and high-speed rolls by heating with an infrared heater having a surface temperature of 830° C. from 14 mm above, quenched and supplied to a stenter to be stretched to 3.9 times in a transverse direction at 125° C. Subsequently, the film was heat set at 220° C. for 10 seconds and relaxed by 4.0% in a transverse direction at 120° C. to obtain a 4.5 μm thick biaxially oriented film. The obtained film had a Young's modulus in a longitudinal direction of 9 GPa and a Young's modulus in a transverse direction of 6 GPa.

The film was heat set in the same manner as in Example 1, the same magnetic coating as in Example 1 was applied to the layer B, and the same back coat as in Example 1 was applied to the layer A on the opposite side to obtain a magnetic tape which was evaluated. The results are shown in Table 1. The same good results as in Example 1 were obtained.

Example 3

A 4.5 μm thick biaxially oriented film was obtained in the same manner as in Example 2 except that the inert particles for layer A in Example 2 was changed to 0.25 wt % of spherical silica particles having an average particle diameter of 0.3 μm and 0.23 wt % of spherical silica particles having an average particle diameter of 0.1 μm, the inert particles for layer B was changed to 0.01 wt % of spherical silica having an average particle diameter of 0.1 μm, the heat setting temperature was changed to 200° C. and the relaxation rate in a transverse direction was changed to 2.0%. The obtained film had a Young's modulus in a longitudinal direction of 9 GPa and a Young's modulus in a transverse direction of 6 GPa.

A magnetic tape was obtained by processing this biaxially oriented film in the same manner as in Example 2. The results are shown in Table 1. The same good results as in Example 1 were obtained.

Comparative Examples 1 and 2

An unstretched film was obtained in the same manner as in Example 2, stretched in the same manner as in Example 2, and heat set at a temperature shown in Table 1 for 10 seconds to obtain a 4.5 μm thick biaxially oriented film. A magnetic tape was obtained in the same manner as in Example 2.

Under conditions 1 or conditions 2, track dislocation was large and bad results were obtained as shown in Table 1.

Comparative Examples 3 to 5

An unstretched film was obtained in the same manner as in Example 2 and the draw ratios in longitudinal and transverse directions of the film were controlled to achieve Young's moduli shown in Table 1. The film was then heat set at 205° C. for 10 seconds to obtain a 4.5 μm thick biaxially oriented film. A magnetic tape was obtained in the same manner as in Example 2.

Under conditions 1 or conditions 2, track dislocation was large and bad results were obtained as shown in Table 1.

TABLE 1

|  | direction | unit | Ex.1 | Ex.2 | Ex.3 | C.Ex.1 | C.Ex.2 | C.Ex.3 | C.Ex.4 | C.Ex.5 |
| --- | --- | --- | --- | --- | --- | --- | --- | --- | --- | --- |
| type of polymer |  |  | PEN | PEN | PEN | PEN | PEN | PEN | PEN | PEN |
| thickness |  | μm | 4.5 | 4.5 | 4.5 | 4.5 | 4.5 | 4.5 | 4.5 | 4.5 |
| Young's moduli | longitudinal direction | GPa | 8.0 | 9.0 | 9.0 | 9.0 | 9.0 | 7.0 | 12.0 | 6.0 |
|  | transverse direction | GPa | 6.5 | 6.0 | 6.0 | 6.0 | 6.0 | 7.3 | 5.5 | 9.0 |
| heat setting temperature |  | ° C. | 240 | 220 | 200 | 250 | 180 | 205 | 205 | 205 |
| relaxation rate in width direction (toe-in) |  | % | 1 | 4 | 2 | 0 | 0 | 0 | 0 | 0 |
| crystallinity |  | % | 43 | 36 | 29 | 46 | 25 | 33 | 33 | 33 |
| heat shrinkage factor | transverse direction | % | 0.2 | 0 | 0.5 | 0.2 | 0.8 | 0.3 | 0.2 | 0.4 |

TABLE 1-continued

| | direction | unit | Ex.1 | Ex.2 | Ex.3 | C.Ex.1 | C.Ex.2 | C.Ex.3 | C.Ex.4 | C.Ex.5 |
|---|---|---|---|---|---|---|---|---|---|---|
| temperature and humidity expansion coefficients | | | | | | | | | | |
| temperature expansion coefficient ($\alpha t$) | transverse direction | $\times 10^{-6}/°$ C. | 14 | 15 | 11 | 19 | 9 | 3 | 19 | −5 |
| humidity expansion coefficient ($\alpha h$) | transverse direction | $\times 10^{-6}/\%$ RH | 14 | 13 | 13 | 16 | 11 | 9 | 17 | 7 |
| $\alpha t + 2\alpha h$ | transverse direction | | 42 | 41 | 37 | 51 | 31 | 21 | 53 | 9 |
| dimensional change in width before and after temperature and humidity treatment under load in longitudinal direction | transverse direction | % | 0.18 | 0.20 | 0.35 | 0.15 | 0.50 | 0.41 | 0.20 | 0.58 |
| surface roughness | | | | | | | | | | |
| on magnetic layer side | | | | | | | | | | |
| WRa | | nm | 6 | 6 | 2 | 6 | 6 | 6 | 6 | 6 |
| WRz | | nm | 200 | 80 | 30 | 80 | 80 | 80 | 80 | 80 |
| on back coat side | | | | | | | | | | |
| WRa | | nm | 6 | 11 | 11 | 11 | 11 | 11 | 11 | 11 |
| WRz | | nm | 200 | 150 | 110 | 150 | 150 | 150 | 150 | 150 |
| track dislocation | | | | | | | | | | |
| conditions 1 | | | ○ | ○ | ○ | x | ○ | ◎ | x | ◎ |
| conditions 2 | | | ◎ | ○ | ○ | ◎ | x | x | ○ | x |
| electromagnetic conversion characteristics | | | ○ | ◎ | ◎ | ◎ | ◎ | ◎ | ◎ | ◎ |

Example 4

Polyethylene-2,6-naphthalene dicarboxylate (intrinsic viscosity of 0.6) which contained 0.02 wt % of calcium carbonate particles having an average particle diameter of 0.6 μm and 0.2 wt % of silica particles having an average particle diameter of 0.1 μm was dried at 180° C. for 5 hours, melt extruded at 300° C. and solidified by quenching on a casting drum maintained at a surface temperature of 60° C. to obtain an unstretched film. This unstretched film was stretched to 5.5 times between two rolls having different speeds at 120° C. and supplied to a stenter to be stretched to 4.1 times in a transverse direction. Subsequently, the film was heat set at 205° C. for 10 seconds to obtain a 5.0 μm thick biaxially oriented film.

The obtained film was slit to a width of 1,000 mm and a length of 5,000 m to prepare a sample roll. In this state, the film was heated to 120° C. over 24 hours, maintained at that temperature for 24 hours and then cooled to room temperature over 24 hours. An endothermal peak different from a peak indicating crystal melting heat was observed in the film after the above heat treatment by DSC measurement and the amount of this endothermal energy was 1.7 mJ/mg. The obtained film had a Young's modulus in a longitudinal direction of 900 kg/mm and a Young's modulus in a transverse direction of 600 kg/mm².

The same magnetic coating as in Example 1 was applied to one side of the above biaxially oriented film to a coating thickness of 0.5 μm, and the resulting film was aligned in a DC magnetic field of 2,500 Gauss, dried by heating at 100° C., supercalendered (linear pressure of 200 kg/cm, temperature of 80° C.) and wound. This wound roll was left in an oven heated at 55° C. for 3 days.

Further, the same back-coating layer coating as in Example 1 was applied to the other side (no magnetic layer side) of the film to a thickness of 1 μm and dried, and the obtained film was cut to 12.65 mm (=½ inch) to obtain a magnetic tape.

The characteristic properties of the obtained film and tape are shown in Table 2. As is obvious from this table, the obtained tape had a small error rate and excellent output characteristics.

Comparative Example 6

A tape was obtained in the same manner as in Example 4 except that the sample roll was not heated. The characteristic properties of the obtained film and tape are shown in Table 2. As is obvious from this table, the track dislocation under conditions 2 of the obtained tape was large.

Comparative Examples 7 and 8

A tape was obtained in the same manner as in Comparative Example 6 except that the draw ratios at the time of forming a biaxially oriented film were changed to achieve Young's moduli shown in Table 2. The characteristic properties of the obtained tape are shown in Table 2. The track dislocation under conditions 1 of Comparative Example 7 was large and the track dislocation under conditions 2 of Comparative Example 8 was also large.

Example 5

Polyethylene-2,6-naphthalene dicarboxylate (intrinsic viscosity of 0.6) for layer B which contained 0.13 wt % of crosslinked silicone resin particles having an average particle diameter of 0.3 μm and 0.25 wt % of spherical silica particles having an average particle diameter of 0.1 μm and polyethylene-2,6-naphthalene dicarboxylate (intrinsic viscosity of 0.6) for layer A which contained 0.1 wt % of spherical silica particles having an average particle diameter of 0.1 μm were prepared. Pellets of these polyethylene-2,6-naphthalene dicarboxylates were dried at 180° C. for 5 hours, supplied to the hoppers of two respective extruders and molten at 300° C., and layer A was laminated on one side of layer B using a multi-manifold co-extrusion die and extruded onto a casting drum maintained at a surface finishing of 0.3 S and a surface temperature of 60° C. to obtain a laminated unstretched film. The thickness of each layer was controlled by the delivery rates of the two extruders to achieve surface roughness shown in Table 1.

The thus obtained laminated unstretched film was stretched to 5.5 times between two rolls having different speeds at 120° C., supplied to a stenter to be stretched to 4.1 times in a transverse direction and heated at 205° C. for 10 seconds.

The obtained laminated biaxially oriented film was slit to a width of 1,000 mm and a length of 5,000 m to prepare a sample roll. In this state, the film was heated to 100° C. over 24 hours, maintained at that temperature for 24 hours and then cooled to room temperature over 24 hours. An endothermal peak different from a peak indicating crystal melting heat was observed in the film after the above heat treatment by DSC measurement and the amount of this an endothermal energy was 1.0 mJ/mg. The obtained film had a Young's modulus in a longitudinal direction of 900 kg/mm$^2$ and a Young's modulus in a transverse direction of 600 kg/mm$^2$.

A magnetic coating was applied to the layer A (magnetic layer side) of this film and a back-coating layer coating was applied to the layer B (no magnetic layer side) in the same manner as in Example 4 and dried, and the obtained film was cut to 12.65 mm (=½inch) to obtain a magnetic tape.

The characteristic properties of the obtained laminated film and tape are shown in Table 2. As is obvious from this table, the obtained tape had a small error rate and excellent output characteristics.

Example 6

A tape sample was obtained in the same manner as in Example 5 except that the inert particles to be contained in the laminated polyester film was changed to 0.25 wt % of spherical silica particles having an average particle diameter of 0.3 μm and to 0.23 wt % of spherical silica particles having an average particle diameter of 0.1 μm for polyethylene-2,6-naphthalene dicarboxylate for layer B, and to 0.01 wt % of spherical silica particles having an average particle diameter of 0.1 μm for polyethylene-2,6-naphthalene dicarboxylate for layer A, and that the heat treatment temperature of a roll sample of the obtained biaxially oriented film was changed to 80° C.

The characteristic properties of the obtained laminated film and tape are shown in Table 2. As is obvious from this table, the obtained tape had a small error rate and excellent output characteristics.

Example 7

A film and tape were obtained in the same manner as in Example 1 except that the inert particles to be contained in the polyester was changed to 0.15 wt % of spherical silica particles having an average particle diameter of 0.3 μm and that the heat treatment temperature of the obtained roll sample was changed to 60° C.

The characteristic properties of the obtained laminated film and tape are shown in Table 2. As is obvious from this table, the obtained tape had a small error rate and excellent output characteristics.

TABLE 2

|  | direction | unit | Ex.4 | Ex.5 | Ex.6 | Ex.7 | C.Ex.6 | C.Ex.7 | C.Ex.8 |
| --- | --- | --- | --- | --- | --- | --- | --- | --- | --- |
| thickness |  | μm | 5.0 | 5.0 | 5.0 | 5.0 | 5.0 | 5.0 | 5.0 |
| Young's moduli | longitudinal direction | GPa | 9.0 | 9.0 | 9.0 | 9.0 | 9.0 | 12.0 | 6.0 |
|  | transverse direction | GPa | 6.0 | 6.0 | 6.0 | 6.0 | 6.0 | 5.5 | 9.0 |
| temperature and humidity expansion coefficients |  |  |  |  |  |  |  |  |  |
| temperature expansion coefficient (αt) | transverse direction | × 10$^{-6}$/° C. | 12 | 12 | 12 | 12 | 12 | 19 | −5 |
| humidity expansion coefficient (αh) | transverse direction | × 10$^{-6}$/% RH | 10 | 10 | 10 | 10 | 10 | 17 | 7 |
| αt + 2αh | transverse direction |  | 32 | 32 | 32 | 32 | 32 | 53 | 9 |
| temperature of heat treatment of a sample roll |  | °C. | 120 | 100 | 80 | 60 | none | none | none |
| energy of heat absorption peak |  | mJ/mg | 1.7 | 1.0 | 0.2 | 0.1 | 0.0 | 0.0 | 0.0 |
| crystallinity |  | % | 31 | 31 | 31 | 31 | 31 | 31 | 31 |
| heat shrinkage factor | transverse direction | % | 0.2 | 0.5 | 0.6 | 0.6 | 0.6 | 0.2 | 0.4 |
| dimensional change in width before and after temperature and humidity treatment under load | transverse direction | % | 0.05 | 0.08 | 0.12 | 0.28 | 0.36 | 0.18 | 0.52 |
| surface roughness |  |  |  |  |  |  |  |  |  |
| on magnetic layer side |  |  |  |  |  |  |  |  |  |
| WRa | | nm | 6 | 6 | 2 | 8 | 6 | 6 | 6 |
| WRz | | nm | 200 | 80 | 30 | 130 | 200 | 200 | 200 |
| on back coat side |  |  |  |  |  |  |  |  |  |
| WRa | | nm | 6 | 11 | 11 | 8 | 6 | 6 | 6 |
| WRz | | nm | 200 | 150 | 110 | 130 | 200 | 200 | 200 |

TABLE 2-continued

| | direction | unit | Ex.4 | Ex.5 | Ex.6 | Ex.7 | C.Ex.6 | C.Ex.7 | C.Ex.8 |
|---|---|---|---|---|---|---|---|---|---|
| track dislocation | | | | | | | | | |
| conditions 1 | | | ○ | ○ | ○ | ○ | ○ | x | ⊚ |
| conditions 2 | | | ⊚ | ⊚ | ⊚ | ○ | x | ⊚ | x |
| electromagnetic conversion characteristics | | | ○ | ⊚ | ⊚ | ⊚ | ○ | ○ | ○ |

The present invention can provide a biaxially oriented polyester film for magnetic recording media, which is useful as a digital data storage tape free from an error caused by track dislocation and having excellent output characteristics.

What is claimed is:

1. A magnetic recording medium comprising a magnetic layer and a biaxially oriented polyethylene-2.6-naphthalene dicarboxylate base film, wherein the base film on the magnetic layer side has a center plane average surface roughness WRa of 1–10 nm and a 10 point average surface roughness WRz of 30–250 nm, said based film having (1) a dimensional change in a direction perpendicular to a load application direction on the film plane of 0.40% or less when the film is treated at 49° C. and 90% RH under a load of 2.7 kg per 1 mm² of unit sectional area in a thickness direction of the film for 72 hours, (2) a crystallinity of 27 to 45%, (3) a temperature expansion coefficient $\alpha t$ in a direction perpendicular to the above load application direction on the film plane of $-5 \times 10^{-6}$ to $+20 \times 10^{-6}$/° C. and a humidity expansion coefficient $\alpha h$ in a direction perpendicular to the above load application direction on the film plane of $+5 \times 10^{-6}$ to $+20 \times 10^{-6}$/% RH, the value of ($\alpha t + 2\alpha h$) being $+45 \times 10^{-6}$ or less, (4) a heat shrinkage factor in a direction perpendicular to the above load application direction on the film plane of 0 to 0.7%, (5) a thickness of 3 to 7 $\mu$m, and (6) a Young's modulus in the above load application direction of at least 6 GPa and a Young's modulus in a direction perpendicular to the above load application direction of at least 6 GPa, said Young's modulus in the above load application direction being larger than said Young's modulus in a direction perpendicular to the above load application direction.

2. The magnetic recording medium of claim 1, wherein the base film has an endothermal peak of 0.05 mJ/mg or more at a temperature range of 120 to 160° C. when measured by a differential scanning calorimeter (DSC).

3. The magnetic recording medium claim 1, wherein the base film has a single-layer structure.

4. The magnetic recording medium of claim 1, wherein the base film has a laminate structure consisting of at least two layers and on the side opposite the magnetic layer, a center plane average surface roughness WRa of 5 to 20 nm and a 10 point average surface roughness WRz of 100 to 300 nm.

5. The magnetic recording medium of claim 1, wherein the base film has a total of the Young's moduli in the two crossing directions of 14 to 20 GPa.

6. The magnetic recording medium of claim 1 which is a magnetic recording media for digital recording.

* * * * *